United States Patent [19]

Mann

[11] Patent Number: 5,484,646
[45] Date of Patent: Jan. 16, 1996

[54] ARTIFICIAL LEATHER COMPOSITE MATERIAL AND METHOD FOR PRODUCING SAME

[75] Inventor: Allan Mann, Cambridge, Mass.

[73] Assignee: Mann Industries, Inc., Framingham, Mass.

[21] Appl. No.: 318,144

[22] Filed: Oct. 5, 1994

[51] Int. Cl.$^6$ ........................................ B32B 3/00
[52] U.S. Cl. .................. 428/198; 428/96; 428/224; 428/105; 428/151; 428/172; 428/114; 428/286; 428/359; 428/287; 428/288; 428/290; 156/60; 156/219
[58] Field of Search ........................ 428/172, 105, 428/151, 904, 114, 315.9, 286, 287, 288, 290, 224, 96, 198; 156/60, 219

[56] References Cited

U.S. PATENT DOCUMENTS 3,607,522  9/1971  Phillips, Jr. ..................... 156/219
4,073,984  2/1978  Okabe ............................ 427/444

Primary Examiner—Patrick J. Ryan
Assistant Examiner—A. Bahta
Attorney, Agent, or Firm—Barry R. Blaker

[57] ABSTRACT

Described herein are artificial leather sub-composite and composite materials which are prepared with minimal or no use of solvents and which exhibit improved resistance to the phenomenon of "read through". The sub-composite and composite materials each include a thermoplastic film facing layer thermally embossed with a simulated leather texture and a barrier layer thermoplastically bonded to the facing layer. The composite material includes a flexible backing layer adhesively bonded to the barrier layer.

37 Claims, 2 Drawing Sheets

5,484,646

ARTIFICIAL LEATHER COMPOSITE MATERIAL AND METHOD FOR PRODUCING SAME

FIELD OF THE INVENTION

This invention relates generally to artificial leather composite materials and is more particularly concerned with an artificial leather sub-composite material comprising a thermally embossed thermoplastic film facing layer thermoplastically bonded to a barrier layer, a multi-layer artificial leather composite material comprising the foregoing sub-composite adhesively bonded to a backing layer and a method for producing said artificial leather sub-composite and composite materials.

BACKGROUND OF THE INVENTION

In accordance with the known prior art methods for producing artificial leatherlike materials, it is known to produce an artificial leather composite material by casting of a polymer solution onto a transfer paper to produce a simulated leather facing layer of the composite. The transfer paper is specially prepared by embossing of a paper sheet material with a negative configuration of the fissures and ridges of a simulated leather texture and by treating the embossed surface of the paper sheet material with an appropriate release agent. The release agent-treated embossed surface of the transfer paper material is coated with an organic solution of the polymeric material and the solvent fraction then driven off from the cast solution by conducting the coated transfer paper through one or more drying ovens. In general, in order to achieve the desired final thickness the preparation of a cast simulated leather facing layer of the composite is usually undertaken as a plurality of solvent based polymer coatings onto the transfer paper surface, following each of which coatings the solvent phase of the cast polymer solution is removed. Once a simulated leather facing layer of the desired thickness has been produced by such solvent coating technique the resulting leather grained facing layer is stripped from the transfer paper and is continuously bonded to a flexible backing material such as, for instance, a paper substrate layer such as cardboard or tagboard or to a layer of a woven (including knitted) or nonwoven fabric, said backing material layer serving to confer structural integrity to the overall artificial leather composite material.

One of problems attendant the preparation of artificial leather composite materials involving the solvent based coating of polymers onto embossed transfer papers broadly resides in the environmental, pollution and toxicological considerations inherently involved in the handling of large quantities of organic solvents. Once the polymer solution is cast onto the embossed transfer paper surface it is, of course, necessary to then safely and completely remove the organic solvent from the so deposited polymer solution and, to the extent possible, to recover the solvent fraction therefrom. While the solvent recovery schemes conventionally utilized in the art are generally effective, they do not usually result in complete recovery of the solvent fraction. Thus, in order to avoid atmospheric pollution, it is usually necessary to yet further treat the atmospheric overhead of the solvent recovery zone before releasing it into the atmosphere, such as by high temperature incineration of said overhead. Accordingly, it will be appreciated that the handling of the solvent fractions of the polymer solutions utilized in the preparation of cast simulated leather facing layers is capital intensive in terms of solvent recovery and pollution control equipment and constitutes a substantial expense in the overall cost of production.

Additionally, the polymeric coating solutions employed in the preparation of cast simulated leather facing layers comprise no more than about 50% by weight polymer solids and, more often, no more than about 30% by weight polymer solids. Accordingly, it is difficult and, in many instances, impossible, to attain the desired finished thickness of the grained texture simulated leather facing layer on the basis of a single coating step and, as was indicated above, cast leather grained facing layers of the desired thickness are usually producible only after plural castings of the polymer solution onto the transfer paper have been achieved. After each coating step it is, of course, necessary to remove, recover or otherwise deal with a substantial solvent fraction from the deposited wet polymer coating. Moreover, the exposure of the relatively expensive release agent-treated embossed transfer paper component of the casting process to the solvent or carrier liquid phase of the polymer solution and the relatively lengthy times to which the transfer paper is exposed, particularly in the presence of the solvent fraction, to the elevated temperatures existing within the drying oven(s) adversely affects its service life.

Yet another problem often experienced in the applications to which such solvent cast artificial leather composite materials are put resides in the problem of "read through" whereby the weave or fibrous nature of the backing layer of the composite and/or the substrate surface to which is is applied tends to be physically expressed through the leather grained surface of the facing layer to which it is adhesively bonded. This cosmetically unattractive phenomenon typically occurs during the course of (a) adhesive bonding of the backing layer to the cast facing layer wherein pressure is brought to bear on the assembled composite at elevated or ambient temperatures, and/or (b) physical stressing of the artificial leather composite material, such as by bending and/or adhesively securing it around a contour of a fixed substrate surface, such as an outside contour of a frame of a briefcase or the last of the heel or toe of a shoe.

In accordance with the present invention the above problems have either been entirely avoided or, in the alternative, have been substantially ameliorated.

OBJECTS OF THE INVENTION

It is a principal object of the invention to provide a novel artificial leather multi-layer sub-composite material comprising a thermoplastic facing layer and a barrier layer and wherein the use of organic solvents and the problems and expenses attendant such use are greatly reduced and/or are entirely avoided.

It is another object of the invention to provide novel artificial leather multi-layer sub-composite and composite materials having increased resistance to the adverse phenonomenon of "read-through".

It is another object of the invention to provide a novel artificial leather sub-composite material which may itself be beneficially used as a simulated leather facing material for the facing of hard surfaced articles or which, in the alternative, may be used as a necessary element in the preparation of the artificial leather multi-layer composite materials of the invention.

It is another object of the invention to provide a novel artificial leather multi-layer composite material.

It is still another object of the invention to provide a novel method for the preparation of multi-layer artificial leather sub-composite and composite materials wherein the use of organic solvents is vastly reduced or altogether avoided.

Other objects and advantages of the present invention will, in part, be disclosed hereinafter and will, in part, be obvious in view of the following description of the invention.

SUMMARY OF THE INVENTION

The novel artificial leather sub-composite material of the invention comprises a thermoplastic facing layer and a barrier layer, said facing and barrier layers each having a facing surface and a backing surface, said facing layer comprising a facing surface having a simulated leather grain texture thermally embossed thereinto by an embossing means, the backing surface of said thermally embossed thermoplastic film facing layer being thermoplastically bonded to the facing surface of said barrier layer during said embossing step. The barrier layer is composed of a thin material having a facing surface sufficiently smooth as to prevent expression of the texture of its facing surface through said facing layer and, additionally, having sufficient physical strength under the conditions of said thermal embossing and said thermoplastic bonding as to prevent substantial cutting through thereof by said embossing means and to provide the resulting sub-composite material with substantially improved read-through properties. The embossed and thermoplastically bonded sub-composite material of the invention may itself be beneficially employed as a simulated leather material, such as by securing the backing surface of its barrier layer to a ware to be faced therewith, for example, a notebook cover or the metallic or wooden frame of a briefcase. Alternatively, said sub-composite material may also be employed as a component in the artificial leather multi-layer composite material of the invention.

The artificial leather multi-layer composite material of the present invention comprises the above-described sub-composite material, the backing surface of said barrier layer thereof being bonded to the facing surface of a flexible backing layer by means of an adhesive layer interposed between said barrier and backing layers. In a preferred embodiment of the invention said adhesive layer is a thermoplastic adhesive which, additionally, may be in the form of a film. In discrete preferred embodiments of the invention the flexible backing layer is composed of a paper, a fabric or natural leather material.

In accordance with the methodology of the invention there is provided an embossing means having an embossing surface defining a negative of the simulated leather grain to be embossed, a thermoplastic facing layer film and a barrier layer, said facing and barrier layers each comprising facing and backing surfaces. The embossing surface of the embossing means is stacked upon the facing surface of said thermoplastic facing layer and the backing surface of said thermoplastic facing layer is stacked upon the facing surface of said barrier layer. The embossing means, thermoplastic facing layer and barrier layer, in stacked array, are heated to bring the thermoplastic facing layer to thermal embossing and thermoplastic bonding temperature. So heated, the embossing surface of the embossing means is pressed against the facing surface of said thermoplastic facing layer of the stacked array with sufficient force as to thermally emboss said facing layer with the positive of said simulated leather grain of said embossing means and, in addition, to thermoplastically bond the backing surface of said facing layer to the facing surface of said barrier layer and to thereby result in the simulated leather sub-composite material of the invention. Said sub-composite material may, itself, be utilized as a facing material to prepare finished wares having artificial leather facings. Alternatively, in manipulative steps which may be conjointly or separately taken with the preparative steps for said sub-composite material, said sub-composite may be fabricated into the artificial leather multi-layer composite material of the invention by adhesively bonding the backing surface of the barrier layer of said sub-composite material to the facing surface of a flexible backing layer. Said adhesive bonding of the said barrier layer of the sub-composite material to the facing surface of said backing layer is achieved by use of an adhesive layer interposed between the backing surface of said barrier layer and the facing surface of said backing layer. In a preferred embodiment of the invention, said adhesive layer is composed of a thermoplastic adhesive composition and, in a yet further preferred embodiment of the invention, said thermoplastic adhesive composition is provided in form of a thermoplastic adhesive film interposed between the backing surface of said barrier layer and the facing surface of said backing layer at the time of said thermal embossing of said facing layer and said concomitant thermoplastic bonding of said facing layer to said barrier layer.

DESCRIPTION OF PREFERRED EMBODIMENTS

Figure 1:
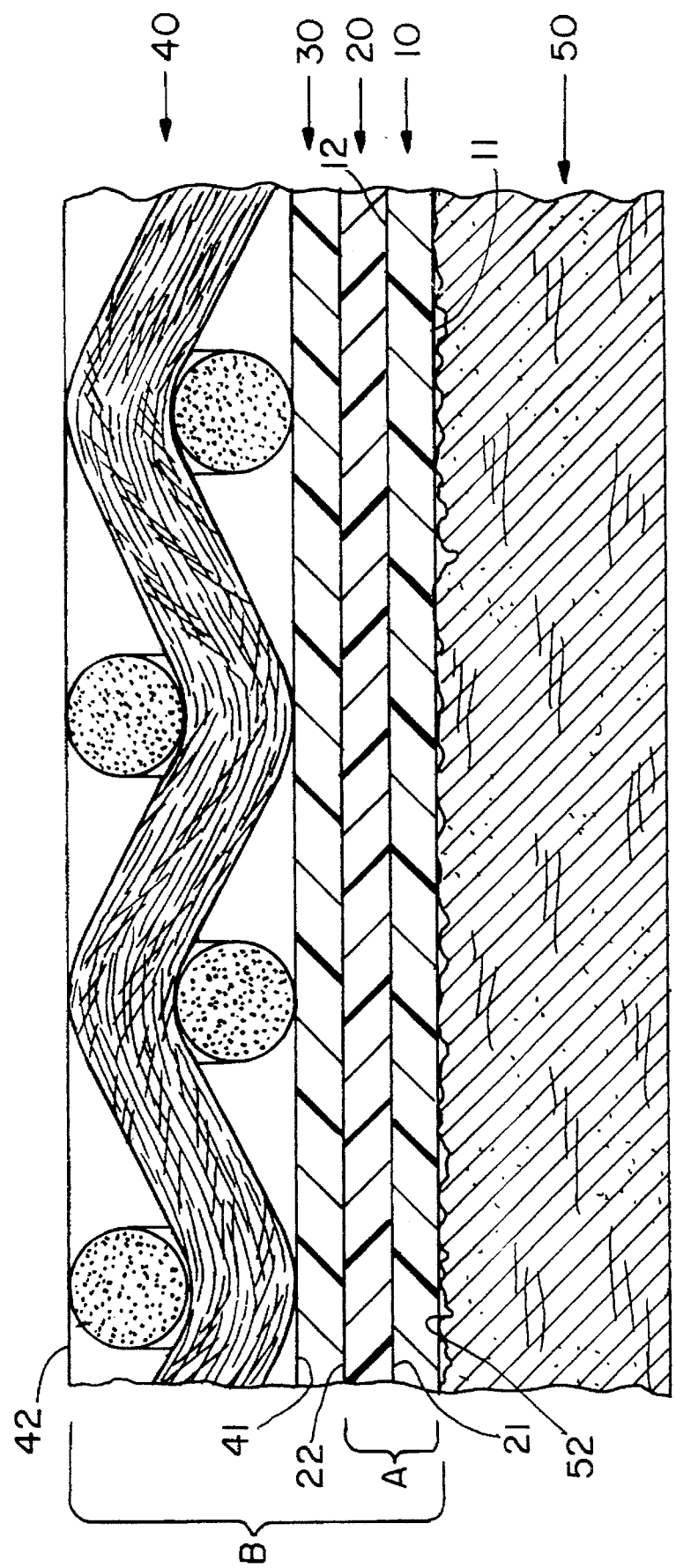
FIG. 1 hereof is a schematic, cross-sectional view of an assembled artificial leather multi-layer composite material arrangement in accordance with the invention, the various layers thereof being shown in stacked array preparatory to thermal embossing and thermoplastic bonding thereof and showing, within bracket A, the arrangement of the facing and barrier layers defining the sub-composite material of the invention and, within the bracket B, the arrangement of the several layers constitituting the artificial leather multi-layer composite material of the invention.

Referring to the drawing hereof, wherein like reference numerals refer to like structures, and with particular reference now to FIG. 1, the artificial leather multi-layer composite material arrangment of the invention broadly comprises, as shown within the bracket B: a thermoplastic film facing layer 10, a barrier layer 20, an adhesive layer 30 and a backing layer 40, the adjacent layers of this arrangement being continuously bonded together. The artificial leather sub-composite material of the invention is defined by the combination of the thermoplastic film facing layer 10 and the barrier layer 20, as denoted within bracket A. In said sub-composite material the facing surface 11 of said facing layer 10 is thermally embossed with a simulated leather grain texture, the backing surface 12 of said facing layer 10 additionally being continuously thermoplastically bonded to the facing surface 21 of the barrier layer 20 during said thermoplastic embossing. Thermoplastic film facing layer 10 constitutes the cosmetic simulated leather layer in the sub-composite and composite materials of the invention and has a grained simulated leather facing surface 11 prepared by thermal embossing thereof and a backing surface 12 which is thermoplastically bonded during the course of said thermal embossing to the facing surface 21 of the barrier layer 20. Since the fissures and ridges defining the simulated grained textures of most leathers are usually of shallow depth, the thickness of the thermoplastic film facing layer 10 in the sub-composite and composite materials of the invention can often be quite thin, say, as little as 0.0005 inch (0.0013 mm). This, too, constitutes an advantage of the present invention because it is conservative of the thermoplastic polymeric film material employed for the facing layer 10 and contributes beneficially to the flexibility and soft hand and feel of the artificial leather sub-composite and composite materials. Many thermoplastic polymers are commercially available in bulk or film form from various manufacturers and film convertors and, by appropriate selection based upon the foregoing criteria, can generally be utilized for the facing layer 10 of the invention. Exemplary of such thermoplastic polymeric materials are, for instance: plasticized polyvinylchloride; polyethylene; polypropylene; polybutene-1; ethylene/vinyl acetate copolymers (EVA); polyacrylics; thermoplastic polyurethanes (TPU); thermoplastic olefins (TPO); thermoplastic elastomers (TPE); butyl rubber; styrene-butadiene-styrene rubber (SBS) and the like. Generally speaking, I have found thermoplastic polyurethane films to constitute an excellent material of choice for the facing layer 10 due to their generally easy processing characteristics, soft hand, abrasion resistance and economy. Thermoplastic polyurethane polymer compositions suitable for conversion into the thermoplastic film facing layer 10 of the invention are currently available in various grades, including grades suitable for conversion into films with good breathability, from such manufacturers or suppliers as: B. F. Goodrich, Co., Akron, Ohio; Dow Chemical U.S.A., Midland, Mich.; E. I. DuPont de Nemours & Co., Inc., Wilmington, Del. and Mobay Corporation, Pittsburgh, Pa. Obviously, the thermoplastic film material of construction for the facing layer film 10 can also include therein the usual and customary compounding ingredients such as lubricants, antioxidants, ultra-violet inhibitors, pigments, colorants, dyes and the like.

Barrier layer 20, having a facing surface 21 and a backing surface 22, constitutes an essential element in both the sub-composite and composite materials of the invention and is possessed of several attributes so as to serve multiple protective functions. Firstly, the facing surface 21 thereof should be sufficiently smooth as to prevent visually observable expression of its texture through the facing layer 10 upon thermal embossing of said facing layer 10 and thermoplastic bonding of the backing surface 12 thereof to the facing surface 21 of said barrier layer 20. Another essential property of the barrier layer 20 is that it have sufficient strength as to prevent the fissures and ridges of the embossing surface 52 of the transfer paper 50 or other embossing means from cutting completely through the stacked facing layer 10/barrier layer 20 array as the simulated leather grain of the embossing surface 52 is thermally impressed into the facing surface 11 of the heat softened facing layer 10 at elevated temperature and whereby thermal embossing of said facing layer 10 and thermoplastic bonding of the backing surface 12 thereof to the facing surface 21 of said barrier layer 20 takes place. Additionally, where this principal strength requirement of the barrier layer 20 is met at the elevated temperatures at which said thermal embossing and thermoplastic bonding is undertaken, said barrier layer 20 will also normally be sufficiently strong at below such temperatures as to mitigate against "read-through" of the texture of the facing surface 41 of said flexible backing layer 40 of the composite or the texture of the surface of a substrate article to which the sub-composite or composite material of the invention may ultimately be secured or bonded as a cosmetic facing therefor. Thus, the barrier layer 20 can be composed of substantially any material having the necessary principal strength properties, such as papers, metallic foils or materials composed at least predominantly of synthetic polymer compositions. Of the foregoing, I generally prefer those materials predominantly or wholly composed of thermoplastic and/or thermoset synthetic polymer compositions, such as synthetic polymer films and nonwoven fabrics whose predominant fiber content is composed of one or more synthetic polymers. In the preferred embodiment of the invention wherein the barrier layer 20 is composed predominantly or wholly of a synthetic polymeric composition and irrespective of its particular physical form, an additional important criterion is that the thermoplastic film facing layer 10 have a Vicat softening temperature, as determined in accordance with the protocol of ASTM D 1521-91, which is at least about 5° F. and, preferably, at least about 10° F. below that of the polymeric constituent of the barrier layer 20. By meeting the foregoing minimum or preferred Vicat softening temperature differentials with respect to the thermoplastic film facing layer 10 and the barrier layer 20, a fabricator of the sub-composite and/or composite materials of the invention is enabled to control the temperatures of the facing layer 10 and barrier layer 20 with adequate precision and selectivity as to soften said thermoplastic film facing layer 10 sufficiently to permit thermal embossing of the simulated leather grain into its facing surface 11 and thermoplastic bonding of its backing surface 12 to the facing surface 21 of the plastic barrier layer 20 while preserving sufficient physical strength of the polymeric constituent of the barrier layer 20 as to maintain the principal protective function thereof during said embossing and thermoplastic bonding. Generally, the thickness of the barrier layer 20, is not generally critical and, irrespective of its composition and provided that the principal strength requirement thereof is met, can be as little as 0.0005 inch (0.0013 mm). As mentioned previously, in the preferred embodiment of the invention wherein the barrier layer 20 is composed predominantly or wholly of a synthetic polymeric material, said material may be in the physical form of a film, a tightly woven fine denier fabric such as a taffeta or a lightweight spun bonded, melt bonded or resin bonded nonwoven fabric whose fiber content is predominantly or wholly composed of thermoset or thermoplastic polymers such as crosslinked or uncrosslinked polyolefins, polyamides or polyesters. Such nonwoven fabrics are commercially available from various sources. For instance, in association with a film facing layer 10 composed of a thermoplastic polyurethane, I have successfully employed as the barrier layer 20 of the artificial leather sub-composite and composite materials of the invention a nonwoven spunbonded fabric composed predominantly of polyester fibers and having a weight of 0.7 oz/yd$^2$.

The artificial leather multi-layer composite material of the invention includes a flexible backing layer 40 having a facing surface 41 and a backing surface 42. The principal structural purpose of said flexible backing layer 40 is to lend strength to the overall multi-layer composite material and, therefore, may be composed of substantially any thin, flexible material of sufficient strength as to achieve this purpose. Exemplary of such materials are: polymeric films, such as those produced by E. I. DuPont de Nemours & Co., Inc. from polyvinylidene fluoride or polyester resins and which are marketed under the trademarks TEDLAR and MYLAR, respectively; papers; natural leather and various fabrics. The facing surface 41 of said backing layer 40 is continuously bonded to the backing surface 22 of barrier layer 20 by means of an adhesive layer 30 interposed therebetween. Preferably, the adhesive layer 30 is a thermoplastic adhesive composition and is in the physical form of a thermoplastic film. Generally speaking, the more conventional materials for use as the backing layer 40 are: papers, such as kraft paper, tag board, Bristol board and cardboard; impregnated and/or saturated webs; fabrics (woven, knitted or nonwoven) or natural leather. Moreover, the particular fiber type employed when the backing layer 40 is a fabric material is generally non-critical and can include synthetic polymeric fibers as well as natural fibers and blends thereof. In general, it can be said that where the end use application of the artificial leather multi-layer composite material of the invention involves exposure of both the facing layer 10 and backing layer 40 to visual observation, such as, for instance, where the composite material is proposed to be utilized for the fabrication of apparel, shoes, hand bags or other accessories and the like, the backing layer 40 and the facing layer 10 can each be viewed upon as serving a cosmetic function. In such instances the preferred material for the backing layer 40 will usually be a fabric of the woven or knitted type, such as a tightly woven or knitted fabric composed of dyed or pigmented synthetic fibers, including nylon, polyester or rayon fibers, or blends of such artificial fibers with one another or with natural fibers such as cotton, wool or silk, or a natural leather. Suitable knitted fabrics include the so-called "stretch" fabrics producible from yarns or threads spun with crimped artificial fibers, particularly polyurethane fibers. Exemplary of such fabrics are those sold under the trademark, SPANDEX, (E. I. DuPont de Nemours & Co., Inc., Wilmington, Del.).

In respect of natural leather materials it should be mentioned that articles faced with natural leather hides, such as cowhide, horsehide and the like, can be faced with the full thickness of so-called "top grain" leather hides or with the thinner top grain layer of the hide from which one or more lower dermal layers lying below the epidermal surface have been skived. In the natural leather industry it is a conventional practice to skive natural hides into "top grain" epidermal and one or more "split" dermal layers, the "top grain" layer of the hide constituting the best quality leather available for facing purposes and the dermal or so-called "split" layers skived therefrom being of lesser quality. Generally, in accordance with conventional practice, such "split" layers of a natural hide are buffed to provide a suede surface thereto and, once so processed, are thereafter usually simply utilized or marketed as suede materials. Ordinarily, the value of such buffed suede "split" layers is usually substantially below that of the "top grain" layer. In accordance with the present invention, however, the value of such natural leather "split" layers can often be substantially increased by utilizing them as the flexible backing material layer 40 component in the artificial leather multi-layer composite materials of the invention. Indeed, the resulting properties of such partially artificial leather multi-layer composite materials of the invention can be found highly beneficial for many applications. For example, superior waterproofness or scuff resistance properties which may be exhibited severally or jointly by the thermoplastic facing layer 10 or barrier layer 20 of the sub-composite material of the invention may be combined with the superior breathability and Comfort properties of a natural leather backing layer 40, thereby to result in a multi-layer composite material of the invention which is particularly useful in the fabrication of shoe uppers. Also, where a top-grain natural leather hide is found to be defective, such as by bruising or scarring thereof during the life of the animal from which it was obtained, it is often conventional practice to simply cut out and discard the defective portions of the hide and utilize only those portions remaining. In accordance with the present invention, however, substantially the entire hide can often be upgraded to a useful status by utilizing it as the backing layer 40 component in the multi-layer composite material of the invention.

Where the artificial leather multi-layer composite material of the invention is to be used in an application wherein the flexible backing layer 40 thereof is to serve no cosmetic purpose, such as by gluing or adhering of the backing layer 40 to an opaque solid substrate as is often called for in the fabrication of luggage, upholstery, jewelery cases, briefcases or like items, or in the event the end use application of the artificial leather composite material calls for doubling it upon itself and securing the flexible backing layers 40 of the doubled elements together, such as in the fabrication of belts, and the like, the backing layer 40 may conveniently be composed of a paper, polymeric film or nonwoven fabric material.

Generally speaking, where the barrier layer 20 and adhesive layer 30 are each composed of a thermoplastic polymer composition, it is desirable that the thermoplastic polymers for the facing layer 10, barrier layer 20 and adhesive layer 30 all belong to the same genus of polymer, thereby to assure compatibility as between the adjacent layers of the composite material.

Fabrication of the artificial leather multi-layer composite material and/or the sub-composite material of the invention may be undertaken either as a batch or a continuous process. Where the quantity of finished artificial leather multi-layer composite material required is relatively small a batch process may be indicated. Here, the layers 10, 20, 30 and 40 of the composite may be stacked onto the embossed surface 52 of a section of a transfer paper 50, as shown in FIG. 1, and the resulting stacked array placed in a press having platens equipped with heating and cooling means. The platens are then closed, under mild pressure, and heated sufficiently as to result in: (a) thermal embossing of the simulated leather grain into the facing surface 11 of the thermoplastic film facing layer 10; (b) thermoplastic bonding of the backing surface 12 of said facing layer 10 to the facing surface 21 of barrier layer 20 and (c) bonding of the adhesive layer 30 to both the backing surface 22 of said barrier layer 20 and the facing surface 41 of said flexible backing layer 40. The platens are then cooled to consolidate the finished multi-layer composite, the press opened, the composite removed and the transfer paper 50 stripped therefrom. Obviously, where it is desired to produce only the artificial leather sub-composite material of the invention, a similar method may be undertaken wherein the stacked array charged into the press comprises only the transfer paper 50, the thermoplastic film facing layer 10 and said barrier layer 20.

Figure 2:
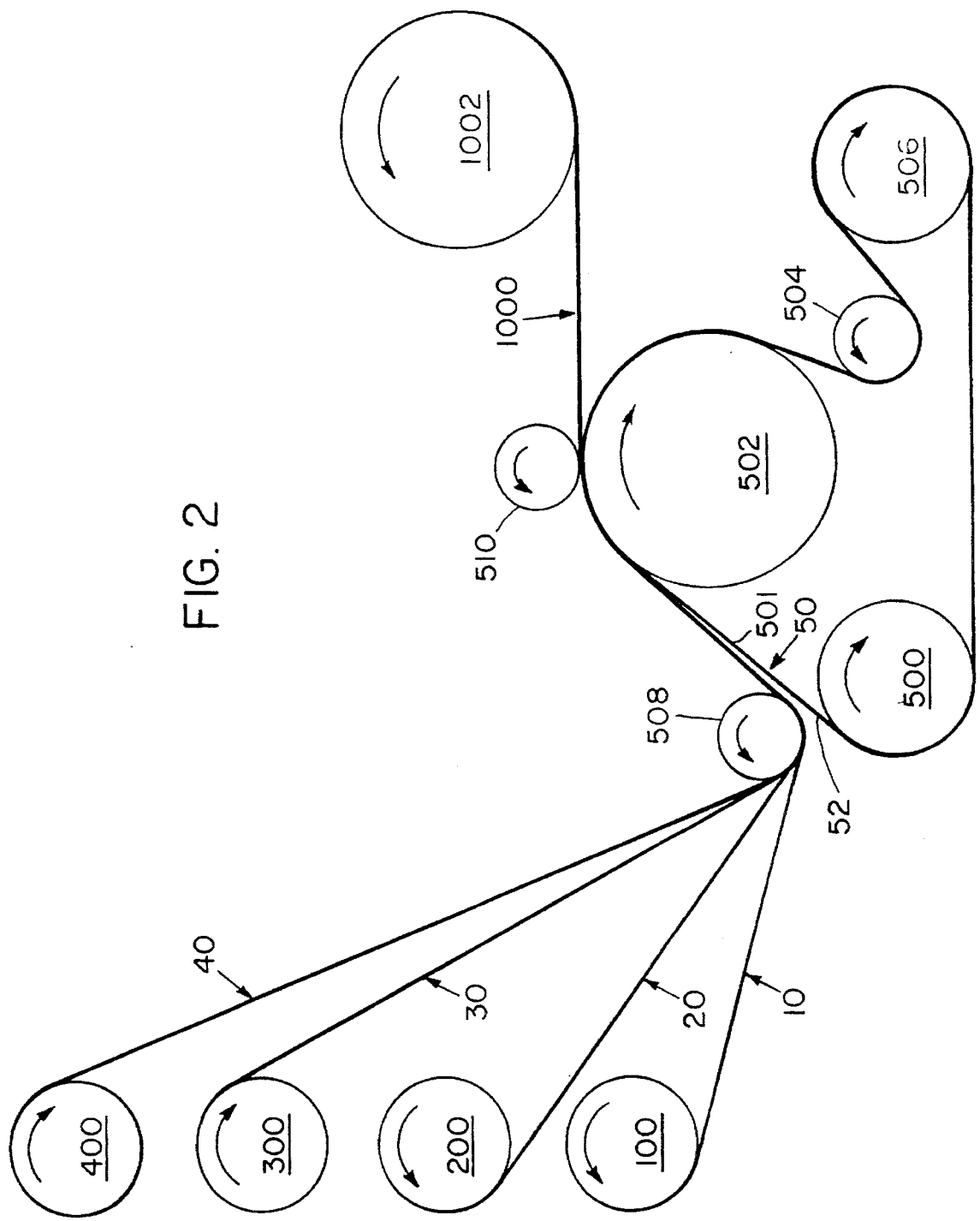
FIG. 2 hereof is a schematic view showing an embodiment of a continuous method for the preparation of the artificial leather multi-layer composite material of the invention wherein, in the assembled composite, thermal embossing of the facing layer, thermoplastic bonding of said facing layer to the barrier layer and adhesive bonding of said backing surface of said barrier layer to the facing surface of the flexible backing layer are concomitantly achieved in a single pass operation.

For large scale production of the artificial leather composite or sub-composite materials of the invention it will usually be desirable to carry out the fabrication process on a continuous basis. In this regard, reference is now particularly made to FIG. 2 hereof wherein there is schematically depicted a flow diagram showing one embodiment of such a continuous process. Therein, the transfer paper 50, bearing its simulated leather embossed surface 52, is provided in the form of an endless belt 501 which is reeved around feed roll 500, heated drum roll 502, idler roll 504, take-up roll 506 and, thence, back to the feed roll 500. The thermoplastic film defining the facing layer 10 is taken from feed roll 100. The material of the thin barrier layer 20 is taken from feed roll 200, disposed above feed roll 100. The adhesive layer 30, in the form of a thermoplastic film, is taken from feed roll 300, disposed above feed roll 200. The material of the backing layer 40 is taken from feed roll 400, disposed above feed roll 300. The layers 10, 20, 30 and 40, as taken from their respective feed rolls, are assembled in superposed array by passing them under roll 508 and the thusly assembled layers of the composite are then passed over the heated drum roll 502, thereby placing the thermoplastic film facing layer 10 of the assembly into contact with the simulated leather embossed surface 52 of the transfer paper 50 and establishing the physical relationships of the respective layers 10, 20, 30 and 40 as shown in detail in FIG. 1. As this multi-layer assembly passes over the circumference of the heating roll 502 the thermoplastic film facing layer 10 is sufficiently softened as to permit embossing of the simulated leather grain into its facing surface 11 by the embossed surface 52 of the transfer paper 50 and thermoplastic bonding of its backing surface 12 to the facing surface 21 of the barrier layer 20. Similarly, the thermoplastic film adhesive layer 30 is sufficiently softened as to effect thermoplastic bonding thereof to the backing surface 22 of barrier layer 20 and to the facing surface 41 of backing layer 40. Upon the attainment of said sufficient softening of the layers 10 and 30, the multi-layer assembly is then brought into the nip defined between heated drum roll 502 and a pressure roll 510 and within which nip the thermoforming and bonding of the artificial leather multi-layer composite of the invention is completed. Upon passage through the nip the resulting artificial leather multi-layer composite, designated at 1000, is parted from the transfer paper 50, cooled, and taken up on storage reel 1002. While not expressly shown in the drawing, cooling of the composite product of the invention need not be passive in nature, but can be aided in any suitable manner, such as by passing the product 1000 over one or more chill rolls preparatory to collecting it on storage reel 1002. Of course, where it is desired to produce the artificial leather sub-composite material of the invention, comprising only the simulated leather embossed facing layer 10 thermoplastically bonded to the thin barrier layer 20, the above-described process may be appropriately modified by taking the feed rolls 300 and 400, which supply the adhesive and flexible backing layers 30 and 40, out of service and by suitably adjusting the nip between the heated drum roll 502 and the pressure roll 510.

While the foregoing description demonstrates certain preferred embodiments of the invention and techniques for the implementation and use thereof, it should be recognized and understood that said description is not to be construed as limiting in nature because many obvious changes, modifications and variations may be made therein without departing from the essential scope, spirit or intention of the invention. For instance, while the particular embossing means described in the foregoing description of preferred embodiments of the invention is in the nature of a transfer paper and while applicant's use of such transfer papers for thermal embossing rather than casting purposes is itself believed to be novel, it is obvious that entirely suitable alternative embossing means for purposes of the present invention may also take the form of metallic platens and/or rolls having a metallic embossing surface defined by an etched and/or engraved negative image of the artificial leather grain to be simulated. Accordingly, it is intended that the invention is to be limited only by the scope of the appended claims.

What is claimed is:

1. An artificial leather sub-composite material comprising a facing layer film composed of a thermoplastic material and having facing and backing surfaces, said facing surface having a simulated leather grain texture thermally embossed thereinto by means of an embossing surface impressed thereinto at elevated temperature sufficient to permit said thermal embossing and, in addition, simultaneous thermoplastic bonding of said facing layer to the barrier layer defined hereinafter, said backing surface of said facing layer thus being thermoplastically bonded to the facing surface of a barrier layer having a facing surface and a backing surface, said barrier layer having sufficient strength under the conditions of said simultaneous thermal embossing of said facing layer and said thermoplastic bonding of said facing layer to said barrier layer to prevent cutting through of said barrier layer by said embossing surface.

2. The artificial leather sub-composite material of claim 1 wherein said barrier layer is at least predominantly composed of a synthetic polymeric material and wherein said thermoplastic material of said facing layer film has a Vicat softening temperature at least about 5° F. below that of said barrier layer.

3. The artificial leather sub-composite material of claim 2 wherein said thermoplastic material of said facing layer film has a Vicat softening temperature at least about 10° F. below that of said barrier layer.

4. The artificial leather sub-composite material of claim 2 wherein said barrier layer is a film.

5. The artificial leather sub-composite material of claim 2 wherein said barrier layer is a nonwoven fabric.

6. The artificial leather sub-composite material of claim 2 wherein said barrier layer is composed of a thermoset material.

7. The artificial leather sub-composite material of claim 6 wherein said barrier layer is a nonwoven fabric.

8. The artificial leather sub-composite material of claim 1 wherein said barrier layer is composed of a thermoplastic synthetic polymeric material and wherein the Vicat softening temperature of said thermoplastic material of said facing layer film is at least about 10° F. below that of said thermoplastic synthetic polymeric material of said barrier layer.

9. The artificial leather sub-composite material of claim 8 wherein the synthetic polymeric material of said barrier layer and the thermoplastic material of said facing layer film are of a common genus.

10. The artificial leather sub-composite material of claim 9 wherein said genus is polyurethane.

11. The artificial leather sub-composite material of claim 1 wherein said barrier layer is composed of paper.

12. The artificial leather sub-composite material of claim 1 wherein said barrier layer is composed of metallic foil.

13. An artificial leather multi-layer composite material comprising:

(A) a facing layer film composed of a thermoplastic material and having facing and backing surfaces, said facing surface having a simulated leather grain texture thermally embossed thereinto by means of an embossing surface impressed thereinto at elevated temperature sufficient to permit said thermal embosssing and, in addition, simultaneous thermoplastic bonding of said facing layer to the barrier layer defined in (B) hereof, said backing surface of said facing layer thus being thermoplastically bonded during said thermal embossing thereof to;

(B) the facing surface of a barrier layer having a facing surface and a backing surface, said barrier layer having sufficient strength under the conditions of said simultaneous thermal embossing of said facing and said thermoplastic bonding thereof to said barrier layer as to prevent cutting through of said barrier layer of (B) by said embossing surface; and (C) a backing layer having facing and backing surfaces, the facing surface of which backing layer is bonded to the backing surface of said barrier layer of (B) by means of an adhesive layer interposed therebetween.

14. The artificial leather composite material of claim 13 wherein said adhesive layer of (C) is thermoplastic.

15. The artificial leather composite material of claim 14 wherein said thermoplastic adhesive layer is a film.

16. The artificial leather composite material of claim 13 wherein said barrier layer is at least predominantly composed of a synthetic polymeric material and wherein said thermoplastic material of said facing layer film has a Vicat softening temperature at least about 5° F. below that of said barrier layer.

17. The artificial leather composite material of claim 16 wherein said thermoplastic material of said facing layer film has a Vicat softening temperature at least about 10° F. below that of said barrier layer.

18. The artificial leather composite material of claim 16 wherein said barrier layer is a film.

19. The artificial leather composite material of claim 16 wherein said barrier layer is a nonwoven fabric.

20. The artificial leather composite material of claim 16 wherein said barrier layer is composed of a thermoset material.

21. The artificial leather composite material of claim 19 wherein said barrier layer is a nonwoven fabric.

22. The artificial leather composite material of claim 13 wherein said barrier layer is composed of a thermoplastic synthetic polymeric material and wherein the Vicat softening temperature of said thermoplastic material of said facing layer film is at least about 10° F. below that of said thermoplastic synthetic polymeric material of said barrier layer.

23. The artificial leather composite material of claim 16 wherein said facing layer film of (A), said barrier layer of (B) and said adhesive layer (C) are each composed of thermoplastic polymeric materials of a common genus.

24. The artificial leather composite material of claim 23 wherein said genus is polyurethane.

25. The artificial leather composite material of claim 13 wherein said barrier layer of (B) is paper.

26. The artificial leather composite material of claim 13 wherein said barrier layer of (B) is metallic foil.

27. The artificial leather composite material of claim 13 wherein said backing layer of (C) is paper.

28. The artificial leather composite material of claim 13 wherein said backing layer of (C) is a fabric.

29. The artificial leather composite material of claim 28 wherein said backing layer of (C) is a nonwoven fabric.

30. The artificial leather composite material of claim 28 wherein said backing layer of (C) is a woven fabric.

31. The artificial leather composite material of claim 13 wherein said backing layer of (C) is natural leather.

32. The artificial leather composite material of claim 31 wherein said natural leather is a layer split from the top grain of a hide.

33. The artificial leather composite material of claim 31 wherein said natural leather includes the top grain of a hide.

34. A method for producing an artificial leather sub-composite material which comprises:

(A) providing a embossing element having an embossing surface comprising a simulated leather grain negative;

(B) providing a facing layer film composed of a thermoplastic material, said facing layer film having a facing surface and a backing surface and stacking said facing layer onto the embossing element of (A) with the facing surface of said facing layer of (B) being established in contact with the embossing surface of said embossing element of (A);

(C) providing a barrier layer having facing and backing surfaces and stacking said barrier layer onto said facing layer film with the facing surface of said barrier layer of (C) being established in contact with the backing surface of said facing layer film of (B), said barrier layer of (C) having sufficient strength under the conditions of thermal embossing and thermoplastic bonding imposed hereunder to prevent cutting through thereof by said embossing surface of said embossing element of (A);

(D) heating the resulting stacked assembly of (A) through (C) to a temperature sufficient to permit thermal embossing of said facing surface of said facing layer film of (B) and thermoplastic bonding of the backing surface of said facing layer film of (B) to the facing surface of said barrier layer of (C);

(E) subjecting the stacked and heated assembly of (D) to pressure sufficient to (i) impress the simulated leather grain embossing surface of said embossing element of (A) into the facing surface of the thermoplastic facing layer film of (B), thereby to thermally emboss said facing surface of (B), and (ii) to simultaneously thermoplastically and continuously bond the backing surface of said thermoplastic facing layer film of (B) to the facing surface of said barrier layer of (C);

(F) cooling the resulting thermally embossed and thermoplastically bonded sub-composite of (E);

(G) removing the embossing element from the thermally embossed facing layer film of the-cooled, thermally embossed and thermoplastically bonded sub-composite of (F); and (H) recovering the resulting artificial leather sub-composite material as product.

35. The method of claim 34 including the further steps of providing a flexible backing layer having facing and backing surfaces and adhesively bonding said facing surface of said flexible backing layer to the backing surface of said barrier layer, thereby to provide an artificial leather multi-layer composite material.

36. The method of claim 35 wherein said adhesive bonding of said facing surface of said backing layer to said backing surface of said plastic barrier layer is accomplished, intermediate steps (C) and (D), by: providing a thermoplastic adhesive film layer; stacking said adhesive film layer onto the backing surface of said barrier layer of the assembly of (C); stacking the flexible backing layer onto said adhesive film layer with the facing surface thereof facing said adhesive film layer to provide a multi-layer assembly having said thermoplastic adhesive film layer interposed between said backing surface of said barrier layer and said facing surface of said backing layer and whereby, in thereafter carrying out steps (D) and (E), said facing surface of said backing layer is adhesively bonded to the backing surface of said barrier layer of (B).

37. The method of claim 34 wherein said embossing element of (A) is a transfer paper.

* * * * *